United States Patent [19]

Draper

[11] 4,386,824

[45] Jun. 7, 1983

[54] MOTOR VEHICLE LAMP REFLECTOR

[75] Inventor: Geoffrey R. Draper, Lichfield, England

[73] Assignee: Lucas Industries Limited, Birmingham, England

[21] Appl. No.: 217,468

[22] Filed: Dec. 17, 1980

[30] Foreign Application Priority Data

Dec. 22, 1979 [GB] United Kingdom ................. 7944313

[51] Int. Cl.³ ........................... F21V 7/06; G02B 5/12

[52] U.S. Cl. ..................................... 350/296; 362/346

[58] Field of Search ................ 350/296, 293; 362/347, 362/349, 296, 297, 298, 300, 350

[56] References Cited

U.S. PATENT DOCUMENTS

| | | | |
|---|---|---|---|
| 1,318,205 | 10/1919 | Helliwell | 362/350 |
| 1,480,364 | 1/1924 | Bean | 362/296 |
| 1,517,362 | 12/1924 | Helliwell | 362/350 |
| 1,546,281 | 7/1925 | Brown | 362/297 |
| 1,583,768 | 5/1926 | Albrecht | 362/349 |
| 2,077,740 | 4/1937 | Caughlan | 350/296 |
| 2,693,524 | 11/1954 | Harris | 362/350 |
| 3,492,474 | 1/1970 | Yamaguchi et al. | 350/293 |
| 4,351,018 | 9/1982 | Fratty | 362/350 |

*Primary Examiner*—Jon W. Henry

[57] ABSTRACT

The rectangular reflector has lateral reflective portions and instead of having upper and lower planar fill-in portions which can result in undesirable reflections, has upper and lower reflective portions which are constituted by an infinite number of non-circular, e.g. parabolic or elliptical, curves. These curves extend forwardly of the reflector body to terminate at the front opening thereof. The curves have foci and focal axes which are coincident and increase progressively in focal length from the center of the reflector to the lateral reflective portions. Such a reflector has improved light collection and light spreading properties.

5 Claims, 5 Drawing Figures

MOTOR VEHICLE LAMP REFLECTOR

This invention relates to a motor vehicle lamp reflector and relates more particularly to a so-called rectangular reflector, i.e. a reflector having a substantially rectangular front opening rather than a circular front opening.

For aesthetic reasons, rectangular reflectors are becoming increasingly popular. The commonly used types of rectangular reflector have a simple paraboloidal reflective surface and it will be appreciated that, because of the requirement to provide a rectangular front opening, the whole of the inner surface of the reflector body cannot have a paraboloidal form if the front opening of the reflector is to be defined by a planar rim. Accordingly, it is commonly the practice to provide upper and lower fill-in portions which are planar. The disadvantage of such a construction is that these planar portions can provide surfaces from which stray reflections occur and this provides the lamp designer with problems in obtaining the required light output and distribution pattern. In the case of vehicle headlamp reflectors which are used solely for producing a passing beam pattern, reflection off the upper, planar fill-in portion is particularly undesirable because this can lead to further reflection off the lower planar fill-in portion which in turn produces an upward reflection which can dazzle oncoming drivers. In this respect, it is to be appreciated that, for a passing beam pattern a shield associated with a bulb filament is provided for preventing reflection off the lower part of the reflector and so automatically shields the lower planar fill-in portion from light rays emanating directly from the filament. However, such a bulb shield is relatively small and does not materially reduce the possibility of reflection off the upper fill-in portion onto the lower fill-in portion. In the case of reflectors used for passing beam purposes only, in addition to the unwanted double reflections mentioned above, unwanted direct reflection off the lower fill-in portion can occur because the aforementioned bulb shield is not provided.

It is to be appreciated that similar problems arise with lamp reflectors having front openings of other shapes such as substantially trapezoidal. The present invention is applicable, of course, to any reflectors which normally require one or more planar or substantially planar fill-in portions and the term "rectangular reflector" as used herein is to be construed accordingly.

It is an object of the present invention to provide a rectangular reflector in which the above disadvantages are obviated or mitigated.

According to the present invention, there is provided a rectangular reflector (as defined herein) comprising a dished body having a front opening and an internal reflective surface, said reflective surface having upper, lower and lateral reflective surface portions, wherein at least one of the upper and lower reflective surface portions comprises a multiplicity of non-circular curves extending forwardly of the body to terminate at said front opening, said curves having coincident foci, and said curves increasing in focal length from the centre of the reflective surface to the lateral reflective surface portions.

In a highly preferred embodiment, there are an infinite number of said non-circular curves which increase progressively in focal length from the centre of the reflective surface to the lateral reflective surface portions. However, in a less effective arrangement, the non-circular curves are arranged in side-by-side groups. The curves in each group may have the same focal length or may have focal lengths which increase progressively in the manner described above, there being discontinuities in the reflective surface between adjacent groups so that there is a stepwise change in the focal lengths of the non-circular curve at each side of each group and an adjacent curve in an adjacent group.

It is preferred for the upper and lower reflective surface portions to be constituted by curves in the manner specified in the last preceding paragraph. However, in the case of reflectors which are intended to be used for passing beam purposes only and in conjunction with a filament shield which shields the bottom part of the reflector, it is possible for only the upper reflective surface portion to be constituted in the manner specified and for the lower planar fill-in portion to be provided. The curves constituting the upper reflective surface may have foci and focal axes which are coincident with the foci and focal axes of the curves of the lower reflective surface, although it is within the scope of the present invention to arrange for foci not to be coincident and/or for the focal axes not to be coincident.

The curves may be parabolic or elliptical.

The present invention is also applicable to rectangular reflectors where the upper half of the reflective surface is stepped relative to the lower half of the reflective surface so that, in effect, there are defined a pair of upper lateral reflective surface portions and a pair of lower lateral reflective surface portions with a step between the upper and lower lateral reflective surface portions at each side of the reflector.

Furthermore, the present invention is applicable to reflectors in which two pairs of lateral reflective surface portions are provided, with one pair being disposed outwardly of the other pair, and said other pair of reflective portions having a focal length which is less than that of said one pair. Examples of such a type of reflector are disclosed in our co-pending British Patent Application No. 2000266A published on Jan. 4, 1979.

An embodiment of the present invention will now be described, by way of example, with reference to the accompanying drawings, in which.

Figure 1:
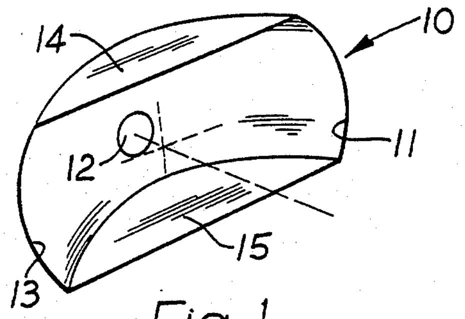
Fig. 1 PRIOR ART
FIG. 1 is a schematic perspective view of a conventional rectangular reflector.

Referring first to FIG. 1, the conventional rectangular reflector comprises a dished body 10 having a generally rectangular front opening 11 defined by a planar rim, and a circular rear opening 12 for receiving a bulb (not shown). The body 10 is formed so that, in its internal surface, there is defined a paraboloidal reflector 13. Because of the shape of the front opening 11, the paraboloidal reflective portion extends only to the front opening 11 at the lateral edges of the latter. The upper and lower longitudinal edges of the opening 11 are defined by upper and lower, planar fill-in portions 14 and 15, respectively. These fill-in portions 14 and 15 are undesirable for the reasons mentioned hereinbefore.

Figure 2:
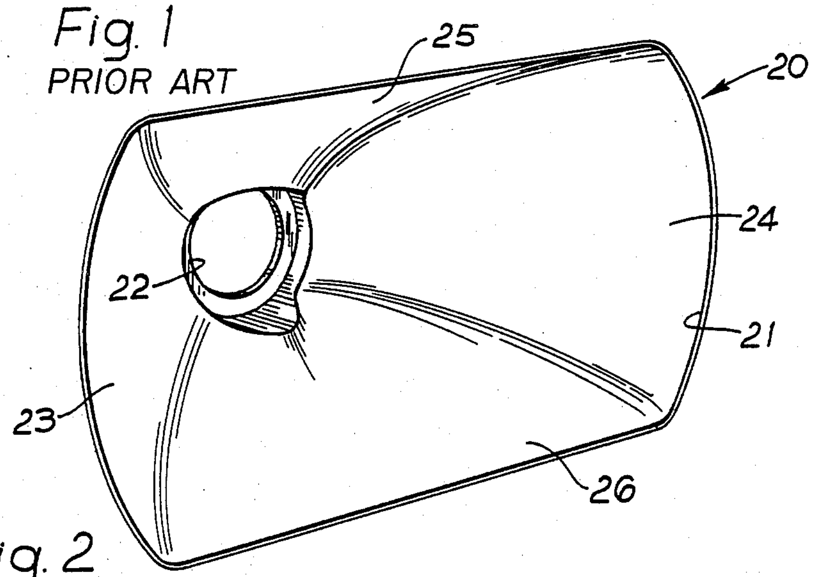
FIG. 2 is a schematic perspective view of a lamp reflector according to the present invention.
Figure 3:
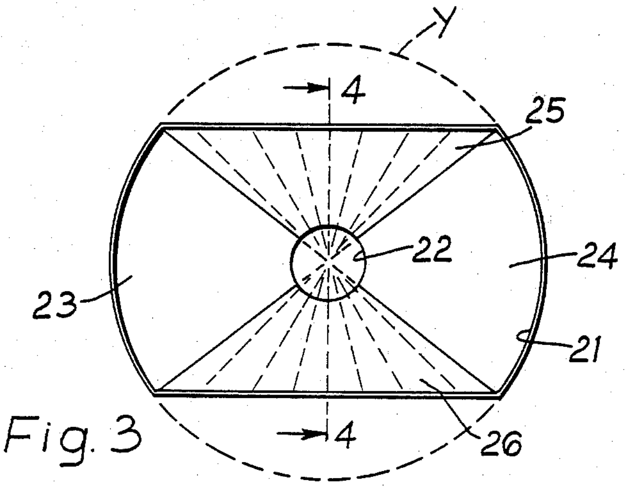
FIG. 3 is a schematic front view of the lamp reflector of FIG. 2.
Figure 4:
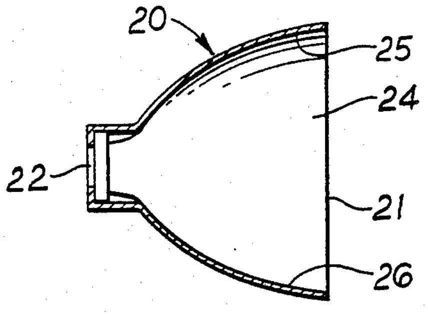
FIG. 4 is a section on the line 4—4 of FIG. 3.

Referring now to FIGS. 2–4 of the drawings, the lamp reflector illustrated therein comprises a dished body 20 having a substantially rectangular front opening 21 defined by a planar rim, and a circular rear opening 22. The whole of the internal surface of the body 20 save for a portion thereof around the rear opening 22 is rendered reflective. The reflective surface consists of a pair of paraboloidal, lateral reflective surface portions 23 and 24 which lie on the surface of the same paraboloid (parabola of revolution). The reflective surface within the body 20 also has upper and lower reflective surface portions 25 and 26 which do not form part of the aforesaid paraboloid and extend from adjacent the rear opening 22 to terminate at the front opening 21.

Figure 5:
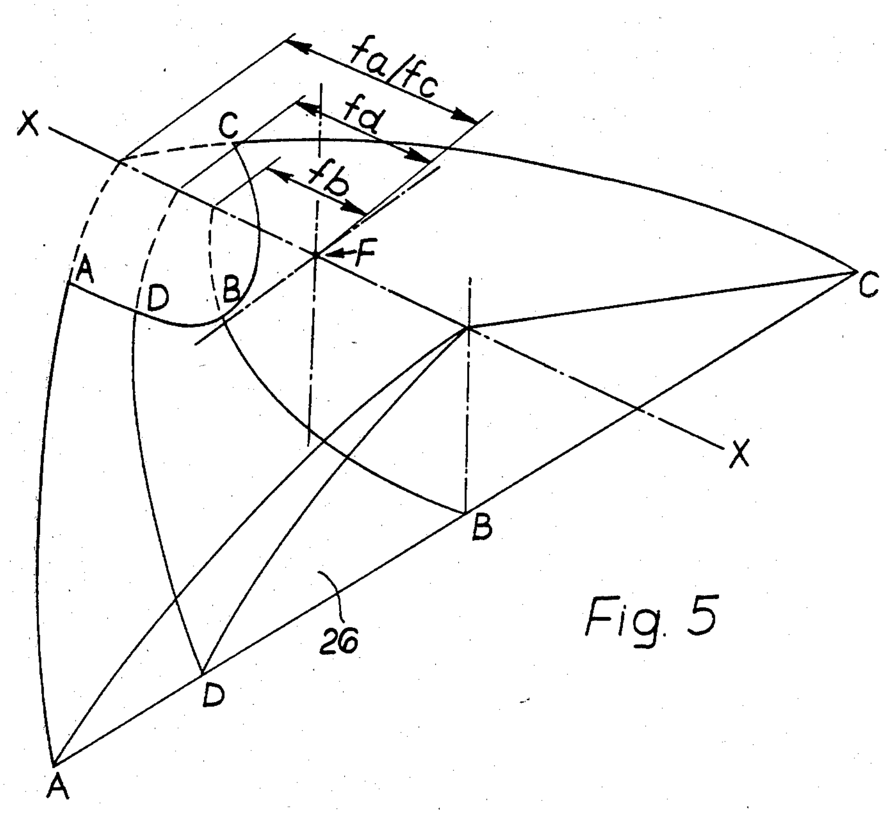
FIG. 5 is a schematic illustration indicating the construction of a lower reflective surface portion forming part of the reflector of FIGS. 2 to 4.

In this embodiment, each of the upper and lower reflective surface portions 25 and 26 is formed from an infinite number of parabolic curves having foci and focal axes which are coincident with the focus and focal axis of the lateral reflective portions 23 and 24. The parabolic curves defining the reflector surface portion 25 and 26 increase progressively in the focal length from the centre of the reflective surface to the lateral reflective surface portions 23 and 24. The parabolic curves defining the reflector surface portions 25 and 26 increase progressively in the focal length from the centre of the reflective surface to the lateral reflective surface portions 23 and 24. In FIG. 5, the construction of the lower reflective surface portion 25 is illustrated and it is to be appreciated that the upper reflective surface portion is similarly constructed. Line X—X represents an axis with which the focal axes of all of the curves and of the reflective surface portions 23 and 24 are coincident. The point F represents the point at which all of the aforesaid foci are coincident. Only four parabolic curves A—A, B—B, C—C and D—D are illustrated in FIG. 5. The curves A—A and C—C represent the lateral limit of the lower reflective surface portion 26, i.e. the lines along which the reflective surface portion 26 merges with the portions 23 and 24, respectively. The curve B—B is the curve which lies at the centre of the portion 26, i.e. it lies in a vertical plane in which the axis X—X lies. The curve D—D represents a typical curve between curves A—A and B—B. As can be seen from FIG. 5, the focal length $f_b$ of the curve B—B is less than the focal length $f_d$ of curve D—D which in turn is less than the focal length F A and F C of curve A—A and C—C. In fact, the focal length $f_a$ and $f_c$ are equal and are the same as the focal length of the lateral reflective surface portions 23 and 24. The focal lengths of the curves progressively increase from curve B—B to curve A—A and curve C—C.

As shown in dotted line in FIG. 5, continuations of the parabolic curves A—A, B—B, C—C and D—D pass through the focal axis X—X. In fact, further continuations of the above-mentioned curves constitute respective curves defining the surface of the upper reflective surface portion 25. Thus, a continuation of curve A—A through the axis X—X will define the lateral limit of the upper reflective surface portion 25 adjacent the lateral reflective surface portion 24, whilst a continuation of the curve C—C through the axis X—X will define the lateral limit of the upper reflective surface portion 25 adjacent the lateral reflective surface portion 23. A continuation of the curve B—B through the axis X—X will define the corresponding centre curve in the upper reflective surface portion 25, said corresponding centre curve lying in the same vertical plane as the axis X—X and the curve B—B.

With the above form of construction, it will be seen that the planar fill-in portions 14 and 15 of the conventional reflector of FIG. 1 have been dispensed with, so that the problem of unwanted reflections from such fill-in portions 14 and 15 has been obviated. In addition to this, useful reflections are obtained off the upper and lower reflective surface portions 25 and 26 to such an extent that the light collection ability of the reflector is better than a purely parabolidal reflector having a circular front opening of a diameter equal to that of the dotted circle Y in FIG. 3. This represents a considerable benefit compared with the relatively small useful light collection capability of the reflector of FIG. 1. In addition to the above advantages, the lamp reflector of FIGS. 2–4 has the added advantage that, because of the shape of the upper and lower reflective surface portions 25 and 26, there is a general horizontal spreading of the light reflected by such surface and this is advantageous particularly for road vehicle applications where lensing is normally provided for effecting a horizontal spread of light from regions above and below the filament. Thus, the lamp reflector of FIGS. 2–4 has the advantage that it enables the lensing to be simplified. It will be appreciated that the lamp reflector of FIGS. 2–4 will normally be used with a lens element fitted over the front opening 21 so as to modify the beam pattern to satisfy vehicle lighting regulations.

The lamp reflector of FIGS. 2–4 can be used with a standard twin filament shielded bulb to enable a lamp assembly fitted with such a reflector to be used both under passing beam conditions and driving beam conditions.

If the lamp reflector were intended for use in a lamp assembly for use solely under passing beam conditions using a shielded bulb, then the bottom part of the reflector would not be used in any case and it would not be necessary to provide a configurated reflective surface such as lower reflective surface portion 26. However, it has previously been proposed to provide a lamp reflector which, instead of having a single paraboloidal surface such as surface 13 of the lamp reflector of FIG. 1, has a reflective surface in which upper and lower surface portions are divided by a step so that the focal points of the upper and lower reflective portions are separated and the focal length of the lower reflective portion is greater than that of the upper reflective portion. With such a construction, with the filament of the bulb disposed between the two foci, the lower reflective portion as well as the upper reflective portion can be utilised under passing beam conditions. With such a form of lamp reflector, planar fill-in portions similar to the above-described planar fill-in portions 14 and 15 are provided. However, when the teachings of the present invention are employed in such a lamp reflector, portions corresponding to the above-described portions 25 and 26 are provided to replace such planar fill-in portions. In such a case, the junctions between the lower reflective surface portion 26 and the lower lateral reflective portions are shielded from the filament to prevent unwanted upward reflection from these junctions.

In the above-described embodiment, the lateral reflective surface portions 23 and 24 have been described as being paraboloidal. However, it is to be appreciated that the lateral surface portions 23 and 24 may be ellipsoidal i.e. shaped to lie on the surface of an ellipse of revolution. Alternatively, the lateral surface portions 23 and 24 may be shaped so as to lie on a surface formed by rotating an ellipse or other non-circular conic section having a focus about an axis which passes through the focus and which is inclined at an acute angle to the focal axis of the conic section.

The curves forming the upper and lower reflective surface portions 25 and 26 may be elliptical rather than parabolic as described above. In such a case, the focal axes of the elliptical curves forming upper and/or lower reflective surfaces may be coincident. In another embodiment, each curve may take the form of part of the axial section of a surface formed by rotation of an ellipse or other non-circular conic section having a focus about an axis which passes through the focus and which is inclined at an acute angle to the focal axis of the conic section. In such an event, the curves will not have coincident focal axes but will be arranged to have coincident foci. The precise combination of shapes will, of course, be chosen to suit the particular requirements of the lamp reflector.

In this specification, the terms "upper", "lower", "vertical", "horizontal" and "transverse" refers to the lamp reflector when in its intended orientation for use.

I claim:

1. A rectangular reflector comprising a dished body having means defining a front opening and an internal reflective surface, said reflective surface having upper, lower and lateral reflective surface portions, wherein at least one of said upper and lower reflective surface portions comprising a muliplicity of non-circular curves extending forwardly of said body to terminate at said front opening, said curves having coincident foci, and said curves increasing in focal length from the centre of the reflective surface portion to said lateral reflective surface portions.

2. The reflector according to claim 1, wherein there are an infinite number of said non-circular curves which increase progressively in focal length from the centre of said reflective surface to said lateral surface portions.

3. The reflector according to claim 1 or 2, wherein both of said upper and lower reflective surface portions comprise said non-circular curves.

4. The reflector according to claim 3, wherein said non-circular curves of said upper reflective surface portion have foci and focal axes which are coincident with the foci and focal axes of said non-circular curves of said lower reflective surface portions.

5. The reflector according to claim 1 or 2, wherein said curves are parabolic.

* * * * *